(12) United States Patent
Bichler

(10) Patent No.: US 9,791,088 B2
(45) Date of Patent: Oct. 17, 2017

(54) LINING ELEMENT FOR THE REHABILITATION OF A PIPELINE

(71) Applicant: Andreas Bichler, Tirol (AT)

(72) Inventor: Andreas Bichler, Tirol (AT)

(73) Assignee: TRELLEBORG PIPE SEALS DUISBURG GMBH (DE)

( * ) Notice: Subject to any disclaimer, the term of this patent is extended or adjusted under 35 U.S.C. 154(b) by 246 days.

(21) Appl. No.: 14/061,069

(22) Filed: Oct. 23, 2013

(65) Prior Publication Data

US 2014/0116557 A1    May 1, 2014

(30) Foreign Application Priority Data

Oct. 30, 2012 (DE) .................. 20 2012 104 166 U

(51) Int. Cl.
| | |
|---|---|
| F16L 55/16 | (2006.01) |
| F16L 55/18 | (2006.01) |
| F16L 55/165 | (2006.01) |
| B32B 27/12 | (2006.01) |
| B32B 27/40 | (2006.01) |
| B32B 1/08 | (2006.01) |
| F16L 55/1645 | (2006.01) |
| F16L 55/179 | (2006.01) |

(52) U.S. Cl.
CPC ............ *F16L 55/1656* (2013.01); *B32B 1/08* (2013.01); *B32B 27/12* (2013.01); *B32B 27/40* (2013.01); *F16L 55/1645* (2013.01); *F16L 55/179* (2013.01); *B32B 2255/02* (2013.01); *B32B 2255/26* (2013.01); *B32B 2255/28* (2013.01); *B32B 2262/0276* (2013.01); *B32B 2262/101* (2013.01); *B32B 2307/7265* (2013.01); *B32B 2597/00* (2013.01)

(58) Field of Classification Search
CPC .................................................. F16L 55/1656
USPC ......................................................... 138/97, 98
See application file for complete search history.

(56) References Cited

U.S. PATENT DOCUMENTS

| | | | | |
|---|---|---|---|---|
| 4,686,126 | A * | 8/1987 | Hyodo | F16L 11/02 138/97 |
| 4,972,880 | A * | 11/1990 | Strand | F16L 55/163 138/103 |
| 5,148,837 | A * | 9/1992 | Ågren | F16L 55/1656 138/121 |
| 5,186,987 | A * | 2/1993 | Imoto | B32B 5/26 138/128 |
| 6,679,966 | B1 * | 1/2004 | Brandenburger | B29C 53/582 156/190 |
| 7,478,650 | B2 * | 1/2009 | Pleydon | B29D 23/001 138/125 |

(Continued)

FOREIGN PATENT DOCUMENTS

| | | |
|---|---|---|
| DE | 19904475 A1 | 7/2000 |
| DE | 102010035128 B3 | 12/2011 |

(Continued)

OTHER PUBLICATIONS http://omnexus.specialchem.com/polymer-properties/properties/hardness-shore-d.*

*Primary Examiner* — Vishal Pancholi
(74) *Attorney, Agent, or Firm* — Dickinson Wright PLLC

(57) ABSTRACT

A lining element for the rehabilitation of a pipeline, the lining element having a substrate layer including a resin-absorbing material and a coating system, the coating system including a fluid-tight barrier layer system formed from several layers.

15 Claims, 1 Drawing Sheet

(56) References Cited

U.S. PATENT DOCUMENTS

Figure 1:
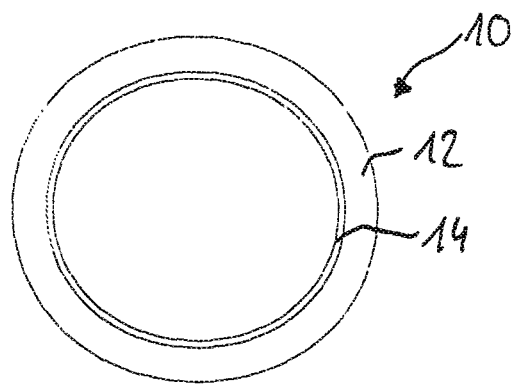

| | | | |
|---|---|---|---|
| 2003/0234057 A1* | 12/2003 | Woolstencroft | F16L 55/1656 138/125 |
| 2005/0133105 A1* | 6/2005 | Criffo' | F16L 55/1654 138/98 |
| 2006/0151042 A1* | 7/2006 | Stringfellow | F16L 11/12 138/125 |
| 2010/0075078 A1* | 3/2010 | Quitter | B32B 5/04 428/35.2 |
| 2010/0243091 A1* | 9/2010 | D'Hulster | F16L 55/1651 138/97 |
| 2012/0145271 A1* | 6/2012 | McKeller | F16L 55/1656 138/98 |
| 2013/0074972 A1* | 3/2013 | Fuechtjohann | F16L 55/1656 138/118 |

FOREIGN PATENT DOCUMENTS

| | | |
|---|---|---|
| DE | 202009018745 U1 | 3/2013 |
| EP | 2573442 A1 | 3/2013 |
| WO | WO2011104357 A2 | 9/2011 |
| WO | WO2012025497 A1 | 3/2012 |

* cited by examiner

LINING ELEMENT FOR THE REHABILITATION OF A PIPELINE

CROSS REFERENCE TO RELATED APPLICATIONS

The present application claims the benefit of priority to German Utility Model Application No. 20 2012 104 166.9, filed Oct. 30, 2012, the disclosure of which is incorporated herein by reference in its entirety.

FIELD OF THE INVENTION

The present invention relates to a lining element for the rehabilitation of a pipeline, comprising a substrate layer of a resin-absorbing material and a coating system. The lining element can also be used, inter alia, for the rehabilitation of a connecting portion between a main pipeline and a branch pipeline.

BACKGROUND OF THE INVENTION

Such lining elements are used in the rehabilitation of pipelines, in particular of main pipelines and branch pipelines, in the area of the sewerage system, and also in the area of buildings. By inserting the lining elements, leaking and defective sections of pipelines, and in particular of pipeline joint portions, can be rehabilitated. To this end, the lining element is permanently bonded to the inner wall of the pipe to be rehabilitated by providing the lining element with an adhesive, with a hardenable resin, in particular, being used as the adhesive.

The lining element comprises a substrate layer including a resin-absorbing material, in particular a non-woven or a fiber material. Prior to the insertion of the lining element, the layer including the resin-absorbing material is impregnated with the resin, and then the lining element is brought by means of a rehabilitating device into its final position in the area to be rehabilitated. In particular, the known inversion methods (eversion methods) are used in the process. After the resin has hardened, the lining element rests against the inner pipe wall in a positive and frictional engagement.

A lining element comprising a layer of resin-absorbing material and a plastic sheet is apparent from WO 2011/104357 A3. A fiber material, a non-woven and/or a spacer fabric are used as the resin-absorbing material. The plastic sheet is manufactured from PVC or thermoplastic polyurethane.

For the known lining element, a calibrating tube, which is most frequently inflated with vapor, is used for inverting, pressing on and hardening the lining element. In order to obtain an optimum installation result, it is necessary, inter alia, to leave the calibrating tube in the inflated state over a longer period of time.

One important requirement for a lining element is that it is flexible as regards curves and bends in the pipeline in order to be capable of adapting as well as possible to the course of the pipeline. In this case, the formation of creases in the lining element is to be avoided or crease formation kept to a minimum. Furthermore, it is important that the lining element is sufficiently flexible with regard to changes of the nominal width of the pipeline. At the same time, the lining element, on the one hand, should not be too thick in order to keep the reduction of the pipe cross section as small as possible and, on the other hand, should not be too thin in order to have a sufficient thickness in the regions of nominal width changes, curves or bends.

The invention is based on the object of providing a lining element which is sufficiently flexible and expansible when it is not yet installed and, at the same time, can have a sufficient tightness and thickness in the installed state.

A lining element according to claim 1 is proposed for achieving the object.

Advantageous embodiments of the lining element according to the invention are specified in the dependent claims 2 to 16.

All of the "lining elements" mentioned in the present invention can also be referred to as liners, rehabilitating elements or pipe liner elements. In principle, such a lining element can have a single-part or multi-part configuration.

The inventive lining element according to claim 1 serves for the rehabilitation of a pipeline. It can also be used, inter alia, for the rehabilitation of a connecting portion between a main pipeline and a branch pipeline, which is also referred to as a branch-off. The lining element comprises a substrate layer including a resin-absorbing material and a coating system, the coating system comprising a fluid-tight barrier layer system formed from several layers. Preferably, the layers are individual thin plies. In particular, they are a flexible and/or expansible substrate layer.

The fluid-tight barrier layer system with its plurality of layers, which may also be referred to as plies, advantageously ensures that the vapor pressure required for inversion and/or pressing and/or hardening is maintained within the lining element because the coating system has a high vapor impermeability. Thus, a calibrating tube can be dispensed with. Furthermore, water can also be used for inversion, pressing and hardening because the coating system of the lining element according to the invention is configured to be fluid-tight. Thus, the lining element also has a high water pressure resistance in addition to its high vapor pressure resistance. Furthermore, the fluid-tight barrier layer system with its plurality of layers is preferably flexible and/or expansible so that the lining element is capable of adapting as well as possible to the course of the pipeline, particularly as regards curves and bends in the pipeline. The expansibility enables an expansion primarily in the radial direction, but also in the longitudinal direction, in order to be able to follow the curves and bends in the pipeline without the formation of creases, if possible.

In particular, the barrier layer system, which is preferably formed from several layers, serves as a vapor barrier and as a resin barrier layer, particularly as an epoxy resin barrier layer. The plurality of layers, which hereinafter are also referred to as barrier layers, therefore can also be defined as vapor barrier layer and/or resin barrier layer. The barrier layer system makes possible the sufficient tightness of the lining element. For example, the barrier layer system advantageously has a weight per unit area of 100 g/m$^2$.

In a preferred embodiment, the barrier layer system comprises a first barrier layer and a second barrier layer. Preferably, both barrier layers are formed as thin plies or sheets and serve, in particular, as an (epoxy) resin barrier layer and/or vapor barrier layer. Each of the barrier layers has a weight per unit area of, for example, 50 g/m$^2$.

In an advantageous embodiment, the barrier layer system comprises a third barrier layer interposed between the first barrier layer and the second barrier layer. The third barrier layer is preferably formed as a thin ply or also as a sheet, in particular as an extruded sheet including a polyurethane. It can be applied, for example, by means of hot rolling at approximately 150°, on to the first barrier layer and/or the second barrier layer. The third barrier layer has a weight of, for example, 60 g/m$^2$. Preferably, the third barrier layer serves as a resin barrier layer and/or vapor barrier layer. The third barrier layer ensures a further improved vapor pressure resistance.

In another preferred embodiment, the coating system comprises at least one anti-friction layer. This anti-friction layer is bonded to the coating system, particularly the barrier layer system, with the anti-friction layer preferably being attached in such a way that, in the installed state of the lining element, it is positioned on the inside, i.e. facing towards the axis of the pipeline. In other words, the barrier layer system is attached to the substrate layer, and the anti-friction layer to the former. In this case, the anti-friction layer is located on the outside when the lining element is not yet installed. When the lining element is then brought to the region to be rehabilitated by means of an inversion method, the lining element is inverted, so that then, the anti-friction layer lies on the inside.

Preferably, the anti-friction layer has a surface structure. In this case, it is preferred that the anti-friction layer has a wavy surface structure with raised portions and/or depressions.

Due to the outward position of the anti-friction layer prior to the final installation, the anti-friction layer, as a consequence of the material used for the anti-friction layer and/or by applying an anti-friction film on to the surface structure, can serve as an installation aid, because the lining element enables an easier inversion due to the anti-friction property of the anti-friction layer. The anti-friction film can be obtained through the surface properties and/or the surface structure. Furthermore, the anti-friction property can be obtained by applying an anti-friction liquid, preferably oil, on the anti-friction layer, and particularly on the surface structure. If a wavy surface structure with raised portions and/or depressions is provided, the adhesion of the anti-friction liquid and thus, the anti-friction property, is improved.

In the installed stated of the lining element, the anti-friction layer faces towards the inside of the pipe and in this case serves as a protective layer for the barrier layer system and the substrate layer. In particular, the anti-friction layer in this case offers protection against the resin being washed out of the substrate layer.

Compared with the barrier layer system, the anti-friction layer preferably has a higher Shore hardness. Advantageously, the anti-friction layer has a weight per unit area of 50 g/m².

In another preferred embodiment, the coating system is bonded to the substrate layer by means of an adhesive layer. Preferably, the coating system is directly bonded to the substrate layer, i.e. without an intermediate ply. Furthermore, the coating system is preferably laminated on to the substrate layer. Furthermore, the coating system can be bonded to the substrate layer by means of a calender. Preferably, the adhesive layer faces towards the substrate layer and serves as a bond of the coating system with the substrate layer.

In a preferred embodiment, the coating system comprises at least one anti-friction layer, a barrier layer system and an adhesive layer. The adhesive layer advantageously provides a bond of the coating system to the substrate layer. Advantageously, the adhesive layer has a weight per unit area of, for example, 40 g/m².

In another preferred embodiment, the coating system is formed from a single thin plastic ply comprising several barrier layers and, optionally, additionally the anti-friction layer. Alternatively, the layers of the coating system are formed from several individual thin plastic plies that comprise the several barrier layers and, optionally, additionally the anti-friction layer.

In another preferred embodiment, the layers of the coating system or the at least one thin plastic ply is formed from a thermoplastic polyurethane, preferably with different hardness degrees (different Shore hardnesses). It was found that this structure, one the one hand, makes possible a high degree of tightness and, on the other hand, a good expansibility with a thin overall thickness.

Advantageously, the substrate layer, the adhesive layer and/or the coating system have a radial expansibility of between approx. 150% and approx. 250%, preferably approx. 200%. This expansibility relates to the thickness direction and makes changes of nominal width possible, for example up to a range of about two dimensions, i.e. an up to twofold radial expansion of the nominal width. Thus, the lining element according to the invention can be used in pipe diameters of 30 mm to 400 mm. Furthermore, the lining element according to the invention is suitable for the installation of pipes with the shape of a circle, egg and/or special profile.

Advantageously, the substrate layer, the adhesive layer and/or the coating system have an expansibility in the longitudinal direction of between approx. 100% and approx. 125%, preferably between approx. 100% and approx. 115%. This expansibility in the longitudinal direction is advantageous with regard to curves, bends and changes of nominal width. In particular, crease formation can also be reduced or prevented.

Preferably, the substrate layer is formed from a fiber material, the fiber material preferably comprising polyester fibers and/or glass fibers. Alternatively or additionally, the substrate layer can comprise polyester fibers, polypropylene fibers, carbon fibers and/or aramid fibers. In principle, polyester needle-punched non-wovens, glass fiber mats and thermoplastic plastic fibers, for example PP, PES, carbon fibers or aramid fibers and combinations of the aforementioned constituents can also be used.

The substrate layer is preferably formed as a single continuous ply. The substrate layer can be impregnated with a resin, in particular an epoxy resin. Particularly advantageously, the substrate layer is formed as a multiknit. A multiknit substrate layer makes possible, in particular, a good radial expansibility and an expansibility in the longitudinal direction, as was already explained above.

Preferably, the substrate layer has a thickness of between approx. 2 mm and approx. 6 mm, more preferably between approx. 3 mm and approx. 5 mm. Preferably, the lining element has a thickness of approx. 3 mm. In another advantageous embodiment, the lining element has a thickness of approx. 5 mm.

Advantageously, the coating system, preferably the barrier layer system, has a thickness of between approx. 100 μm and approx. 250 μm.

In another embodiment, the substrate layer has a weight per unit area of between approx. 300 g/m² and approx. 1000 g/m², preferably between approx. 400 g/m² and approx. 900 g/m². More preferably, the weight per unit area can be between approx. 500 g/m² and ca. 800 g/m².

In another advantageous embodiment, the coating system, preferably the barrier layer system, has a weight per unit area of between approx. 100 g/m² and approx. 300 g/m², preferably between approx. 150 g/m² and approx. 250 g/m².

It was found that for the aforementioned weights per unit area for the coating system, the barrier layer system and/or the substrate layer, the desired minimum wall thicknesses are made possible for the lining element in the installed state, which in pipelines in buildings are approximately at least 2 mm, and in the case of buried pipelines, approximately at least 3 mm.

A method for the rehabilitation of a pipeline and/or a connecting portion between a main pipeline and a branch pipeline by means of the lining element according to the invention can be carried out as follows. First, the lining element, in particular the substrate layer, is impregnated with a resin, in particular an epoxy resin. When rehabilitating a connecting portion, the lining element has a branch pipe portion, which prior to insertion into the pipeline is introverted into the interior of the main pipeline portion. Subsequent thereto, the lining element is brought to the region to be rehabilitated by means of a rehabilitating device. After positioning the lining element in the region to be rehabilitated, the inside of the lining element is put under pressure by means of a fluid, whereby the lining element is pressed with its substrate layer against the inner wall of the pipeline. In the process, the lining element may optionally be inverted. In particular in the case of a rehabilitation of a connecting portion, the branch pipe portion introverted into the inside of the main pipe portion is additionally inverted into the branch pipe. After pressing it on or inverting it, the pressure within the lining element can be reduced so that the material of the lining element is able to relax. This reduced pressure is referred to as hardening pressure and is between approx 0.25 bars and 0.5 bars, and therefore lies slightly below the inversion pressure. The hardening pressure is maintained over a certain period of time until the resin has hardened and the lining element rests against the inner wall of the pipeline in a positive and frictional engagement. Advantageously, no calibrating tube is required for inverting or hardening the lining element according to the invention, because the fluid-tight barrier layer system provides for a sufficient vapor and/or water pressure resistance.

Figure 2:
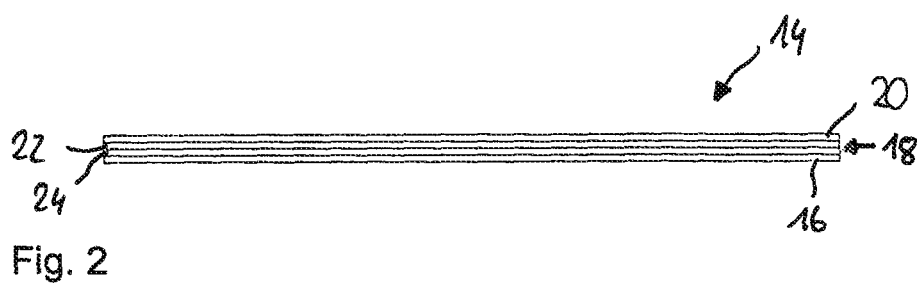
Figure 3:
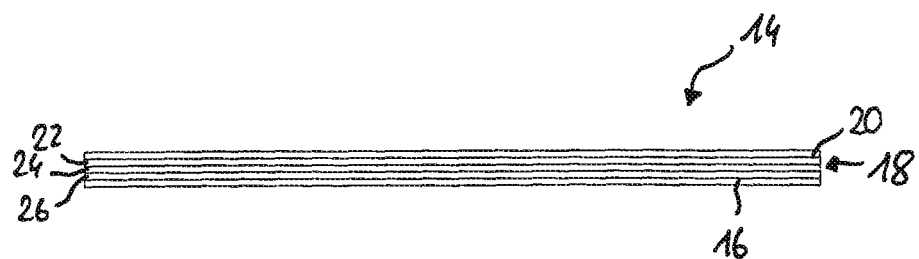

The lining element according to the invention is explained in more detail below with reference to the attached drawings. The Figures schematically show:

FIG. 1 a front view of a lining element according to the invention in the installed state in a pipeline that is not shown;

FIG. 2 an enlarged illustration of a coating system of the lining element when it is not yet installed, which comprises four layers; and FIG. 3 an enlarged illustration of an alternative coating system, which comprises five layers.

FIG. 1 shows a lining element 10 in the installed state inside a pipeline that is not shown. The lining element 10 serves for the rehabilitation of a pipeline and rests against the inner wall of the pipeline in the installed state. The lining element 10 comprises a substrate layer 12 and a coating system 14.

The substrate layer 12 is formed as a continuous layer including fiber material. In particular, the substrate layer 12 is formed as a multiknit and comprises a plurality of interwoven polyester fibers and/or glass fibers. The substrate layer 12 can be impregnated with a hardenable resin and, in the hardened state, rests against the region to be rehabilitated. Prior to the insertion of the lining element 10 into the pipeline, the substrate layer 12 is impregnated with a resin.

The coating system 14 has several interconnected layers or plies, which are explained in detail below.

FIG. 2 shows a first variation of the coating system 14. The coating system 14 comprises an anti-friction layer 16, a barrier layer system 18 and an adhesive layer 20. The barrier layer system 18 comprises a first barrier layer 22 and a second barrier layer 24. The layers 16, 22, 24 are configured as thin plies including plastic, in particular of a thermoplastic polyurethane. Preferably, these layers 16, 22, 24 have different hardness degrees. The adhesive layer 20 faces towards the substrate layer 12 and serves for bonding the coating system 14 to the substrate layer 12 by a substance-to-substance fit, preferably by the coating system 14 being laminated on to the inner face of the carrier layer 12. The first and second layers 22, 24 are adjacent to the adhesive layer 20 and are configured as fluid-tight barrier layers. In particular, they serve as vapor and resin barrier layers, so that, on the one hand, the fluid required inside the lining element 10 for inversion and hardening cannot escape, and on the other hand, the resin is not gradually washed out of the substrate layer after rehabilitation.

The anti-friction layer 16 is adjacent to the barrier layer system 18 and faces towards the inside of the pipe in the installed state of the lining element 10. When the lining element 10 is not yet installed, the anti-friction layer 16 is located on the outside. When the lining element 10 is then brought to the region to be rehabilitated by means of an inversion method, the lining element 10 is inverted so that then, the anti-friction layer 16 lies on the inside.

In the installed state, the anti-friction layer 16 also serves as a protective layer against abrasion and/or damage caused by the substances transported with the waste water or rain water. Furthermore, it serves as a chemical protective layer against chemical reactions of the waste water and/or the transported substances. Moreover, it is capable of preventing the resin from being washed out of the substrate layer 12.

The anti-friction layer 16 has a special wavy surface structure with raised portions and/or depressions and serves as an installation aid.

Due to the outward position of the anti-friction layer 16 prior to the final installation, it, as a consequence of applying an anti-friction liquid on to the surface structure of the anti-friction layer 16, can well serve as an installation aid, because the lining element 10 enables an easier inversion due to the anti-friction film thus formed. Due to the wavy surface structure with the raised portions and/or depressions, the anti-friction liquid is able to adhere well and provide the anti-friction properties.

Compared with the other layers 20, 22, 24, the anti-friction layer 16 preferably has a greater Shore hardness.

FIG. 3 shows a second embodiment of the coating system 14, which differs from the first embodiment in that the coating system 18 has a third barrier layer 26 interposed between the first barrier layer 22 and the second barrier layer 24. The third barrier layer 26 preferably is a polyurethane-based extruded sheet, which is applied on to the first barrier layer 22 and/or the second barrier layer 24 by, for example, hot rolling at approx. 150°. Compared with the first embodiment, the second embodiment of the coating system 14 ensures a higher vapor pressure resistance.

The lining element 10 preferably has the following technical data, wherein not all of the values specified below have to be realized at the same time; rather, only some of these values can be also be realized. For example, the adhesive layer 20 has a weight of approximately 40 g/m$^2$. The first barrier layer 22, the second barrier layer 24 and the anti-friction layer 16 preferably each have a weight of approx. 50 g/m$^2$. The third barrier layer 26 has a weight of, for example, approx. 60 g/m$^2$. The substrate layer has a weight per unit area of approx. between 300 g/m$^2$ and 1000 g/m$^2$. The coating system or the barrier layer system 18 preferably has a weight per unit area of between 100 g/m$^2$ and 300 g/m$^2$. In the case of the four-layered embodiment according to FIG. 2, the thickness of the lining element 10 in the installed state is about 3 mm, and in the five-layered embodiment according to FIG. 3, about 5 mm. In this case, the coating system or the barrier layer system 18 preferably has a thickness of between approx. 100 µm and approx. 250 µm. The substrate layer 12 as well as the coating system 14 are configured in such a way that they can be expanded up to twice their nominal width in the radial direction.

REFERENCE NUMERALS LIST

10 Lining element
12 Substrate layer
14 Coating system
16 Anti-friction layer
18 Barrier layer system
20 Adhesive layer
22 First barrier layer
24 Second barrier layer
26 Third barrier layer

The invention claimed is:

1. A lining element for the rehabilitation of a pipeline, the lining element comprising, in a state prior to installation of the lining element in a pipeline to be rehabilitated:
   (a) a substrate layer in the form of a continuous layer of a resin-absorbing material, the substrate layer defining an outside surface of the lining element for contacting an interior surface of a pipeline to be rehabilitated; and
   (b) a coating system including a fluid-tight barrier bonded to the substrate layer and formed of at least two adjacent, fluid-tight barrier layers, and the coating system further including at least one anti-friction layer adjacent the fluid-tight barrier, the anti-friction layer defining an interior surface of the lining element for facing toward the inside of the pipeline to be rehabilitated;
   wherein, in an installed state of the lining element in which the lining element is bonded to the interior surface of the pipeline to be rehabilitated, the at least one anti-friction layer remains part of the coating system so as to define a protective layer against substances transported in the pipeline.

2. The lining element according to claim 1, wherein the fluid-tight barrier comprises a first barrier layer and a second barrier layer.

3. The lining element according to claim 2, wherein the fluid-tight barrier comprises a third barrier layer.

4. The lining element according to claim 1, wherein the anti-friction layer has a wavy surface structure with raised portions and/or depressions.

5. The lining element according to claim 1, wherein the fluid-tight barrier is bonded to the substrate layer by means of an adhesive layer.

6. The lining element according to claim 1, wherein the coating system is formed from a single thin plastic ply comprising the fluid-tight barrier and the anti-friction layer.

7. The lining element according to claim 1, wherein the coating system is formed from several individual thin plastic plies that comprise the fluid-tight barrier and the anti-friction layer.

8. The lining element according to claim 1, wherein the fluid-tight barrier and the anti-friction layer are formed from a thermoplastic polyurethane with different hardness degrees.

9. The lining element according to claim 5 wherein the substrate layer, the adhesive layer and/or the coating system have a radial expansibility of between approx. 150% and approx. 250%.

10. The lining element according to claim 5 wherein the substrate layer, the adhesive layer and/or the coating system have an expansibility in the longitudinal direction of between approx. 100% and approx. 125%.

11. The lining element according to claim 1, wherein the substrate layer is formed from a fiber material, the fiber material comprising polyester fibers and/or glass fibers.

12. The lining element according to claim 1, wherein the substrate layer has a thickness of between approx. 2 mm and approx. 6 mm.

13. The lining element according to claim 1, wherein the fluid-tight barrier has a thickness of between approx. 100 µm and approx. 250 µm.

14. The lining element according to claim 1, wherein the substrate layer has a weight per unit area of between approx. 300 $g/m^2$ and approx. 1000 $g/m^2$.

15. The lining element according to claim 1, wherein the fluid-tight barrier has a weight per unit area of between approx. 100 $g/m^2$ and approx. 300 $g/m^2$.

* * * * *